(12) United States Patent
Sun et al.

(10) Patent No.: US 12,292,568 B2
(45) Date of Patent: May 6, 2025

(54) LIGHT SPOT SCANNING DEVICE, SCANNING METHOD THEREOF, AND MEDICAL COSMETOLOGY DEVICE

(71) Applicant: FOCUSLIGHT TECHNOLOGIES INC., Xi'an (CN)

(72) Inventors: Lichen Sun, Xi'an (CN); Lili Wang, Xi'an (CN); Hongtao Chong, Xi'an (CN); Xiaobo Liu, Xi'an (CN); Pei Wu, Xi'an (CN); Kai Yang, Xi'an (CN)

(73) Assignee: FOCUSLIGHT TECHNOLOGIES INC., Xi'an (CN)

( * ) Notice: Subject to any disclaimer, the term of this patent is extended or adjusted under 35 U.S.C. 154(b) by 626 days.

(21) Appl. No.: 17/545,394

(22) Filed: Dec. 8, 2021

(65) Prior Publication Data

US 2023/0176360 A1 Jun. 8, 2023

(51) Int. Cl.
*G02B 26/10* (2006.01)
*G02B 26/08* (2006.01)
*G02B 27/30* (2006.01)

(52) U.S. Cl.
CPC .......... *G02B 26/10* (2013.01); *G02B 26/0816* (2013.01); *G02B 27/30* (2013.01)

(58) Field of Classification Search
CPC ..... G02B 26/10; G02B 26/0816; G02B 27/30
(Continued)

(56) References Cited

U.S. PATENT DOCUMENTS

| | | | |
|---|---|---|---|
| 2014/0005643 A1* | 1/2014 | Chang | A61B 18/203 359/198.1 |
| 2019/0094365 A1* | 3/2019 | Fujita | G01V 8/18 |

FOREIGN PATENT DOCUMENTS

| | | | |
|---|---|---|---|
| JP | S63133759 A | * | 6/1988 |
| JP | H01124130 A | * | 5/1989 |
| JP | H02186205 A | * | 7/1990 |

OTHER PUBLICATIONS

JP S63133759 (Year: 1988).*
JP H02186205 A (Year: 1990).*
JP H01124130 A (Year: 1989).*

* cited by examiner

*Primary Examiner* — William Choi
(74) *Attorney, Agent, or Firm* — IPro, PLLC

(57) ABSTRACT

The invention provides a light spot scanning device, a scanning method thereof, and a medical cosmetology device, belonging to the technical field of medical cosmetology, comprising a laser and a collimating lens and a reflector arranged in sequence along the optical path transmission direction of the laser. The reflector is also connected with a driving member, the laser beam emitted by the laser forms a linear light spot through the collimating lens, and the reflector is driven to continuously rotate according to a preset path through the driving member. A plurality of linear light spots formed by the continuous rotation are sequentially overlapped on the light exiting side of the reflector to form a scanning linear light spot. Each time the reflector rotates, a group of linear light spots is formed. After continuous rotation, multiple groups of sequentially overlapping linear light spots are formed on the light exiting side of the reflector, called scanning linear light spots. The adjacent linear light spots have overlapping regions, and the energy density of the overlapping regions is higher than the energy density of the original light spot, which solves the problem of low energy density in the prior art. Moreover, the rotation of the reflector is used to superimpose the light spots without increasing the power of the laser, so that the light spot scanning device has a small structural size, low cost and high reliability.

11 Claims, 2 Drawing Sheets

(58) Field of Classification Search
USPC .......................................................... 359/318
See application file for complete search history.

LIGHT SPOT SCANNING DEVICE, SCANNING METHOD THEREOF, AND MEDICAL COSMETOLOGY DEVICE

TECHNICAL FIELD

The invention relates to the technical field of medical cosmetology, in particular to a light spot scanning device, a scanning method thereof, and a medical cosmetology device.

BACKGROUND ART

Medical cosmetology is becoming more and more popular. People use medical cosmetology to perform freckle removal and hair removal and other cosmetology treatments. Existing medical cosmetology devices mainly use high-power lasers, during hair removal, to concentrate energy to achieve the effect of hair removal. However, when using high-power lasers for hair removal, to concentrate the hair removal energy, a higher-power laser is needed to achieve this, which makes the cost of hair removal high.

SUMMARY

The purpose of the present invention is to provide a light spot scanning device, a scanning method thereof, and a medical cosmetology device, which can increase the energy density and have a low cost.

The embodiment of the present invention is implemented as follows.

An aspect of embodiments of the present invention provides a light spot scanning device, which includes a laser, a collimating lens and a reflector arranged in sequence along the optical path transmission direction of the laser, wherein the reflector is also connected with a driving member, and the laser beam emitted by the laser forms a linear light spot through the collimating lens, and the reflector is driven to continuously rotate according to a preset path by the driving member, and a plurality of the linear light spots formed by the continuous rotation overlap sequentially on the light exiting side of the reflector to form a scanning linear light spot.

Optionally, it further includes a pulse power supply electrically connected to the laser, and the pulse power supply is used to provide a pulse current between the lasers.

Optionally, the driving member is a rotating electric machine, and an output shaft of the rotating electric machine is connected to the reflector.

Optionally, it further includes a controller, which is respectively electrically connected to the pulse power supply and the driving member, wherein when the pulse power supply outputs a low-level signal, the controller controls the driving member to start working for a preset stroke.

Optionally, at any moment when the reflector is driven to rotate, adjacent linear light spots form an overlapping region, and the area m of the overlapping region satisfies: $m=(a-\omega ct)b$, wherein a is the width of the linear light spot along the fast axis direction; b is the width of the linear light spot along the slow axis direction, w is the rotation angular velocity of the driving member; c is the distance between the reflector and the working plane; and t is the duration that the pulse power supply outputs the low-level signal.

Optionally, the laser is a semiconductor laser.

Another aspect of the embodiments of the present invention provides a medical cosmetology device, which includes the above-mentioned light spot scanning device.

Another aspect of the embodiments of the present invention provides a light spot scanning method, using the above-mentioned light spot scanning device, which includes following steps: a driving member driving a reflector to rotate according to a preset path; and a laser beam emitted by a laser entering the reflector after passing through a collimating lens, and forming a scanning linear light spot on the light exiting side of the reflector.

Optionally, the step of a driving member driving a reflector to rotate according to a preset path includes: the driving member responds to the laser power-down signal to drive the reflector to rotate according to the preset path.

Optionally, the light spot scanning device further includes a pulse power supply electrically connected to the laser, and the power-down signal of the laser is a low-level signal of the pulse power supply.

The beneficial effects of the embodiments of the present invention include: according to the light spot scanning device and its scanning method and medical cosmetology device provided by the embodiments of the present invention, the laser beam output by the laser forms a uniform and small-sized linear light spot through a collimating lens, and the linear light spot is then emitted through a reflector, and the reflector is driven to rotate by a driving member, with each time of rotation, a set of linear light spots is formed, after the reflector rotates continuously according to the preset path, multiple sets of sequentially overlapping linear light spots are formed on the light exiting side of the reflector, called scanning linear light spots, adjacent linear light spots have overlapping region, the energy density of the overlapping region is higher than the energy density of the original light spot, which solves the problem of low energy density in the prior art. Moreover, the rotation of the reflector is used to superimpose the light spots without increasing the power of the laser, so that the light spot scanning device has a small structural size, low cost and high reliability.

BRIEF DESCRIPTION OF DRAWINGS

In order to explain the technical solutions of the embodiments of the present invention more clearly, the following will briefly introduce the drawings needed to be used in the embodiments. It should be understood that the following drawings only show some embodiments of the present invention, and therefore should not be regarded as a limitation of the scope. For those of ordinary skill in the art, other related drawings can be obtained based on these drawings without creative work.

Figure 1:
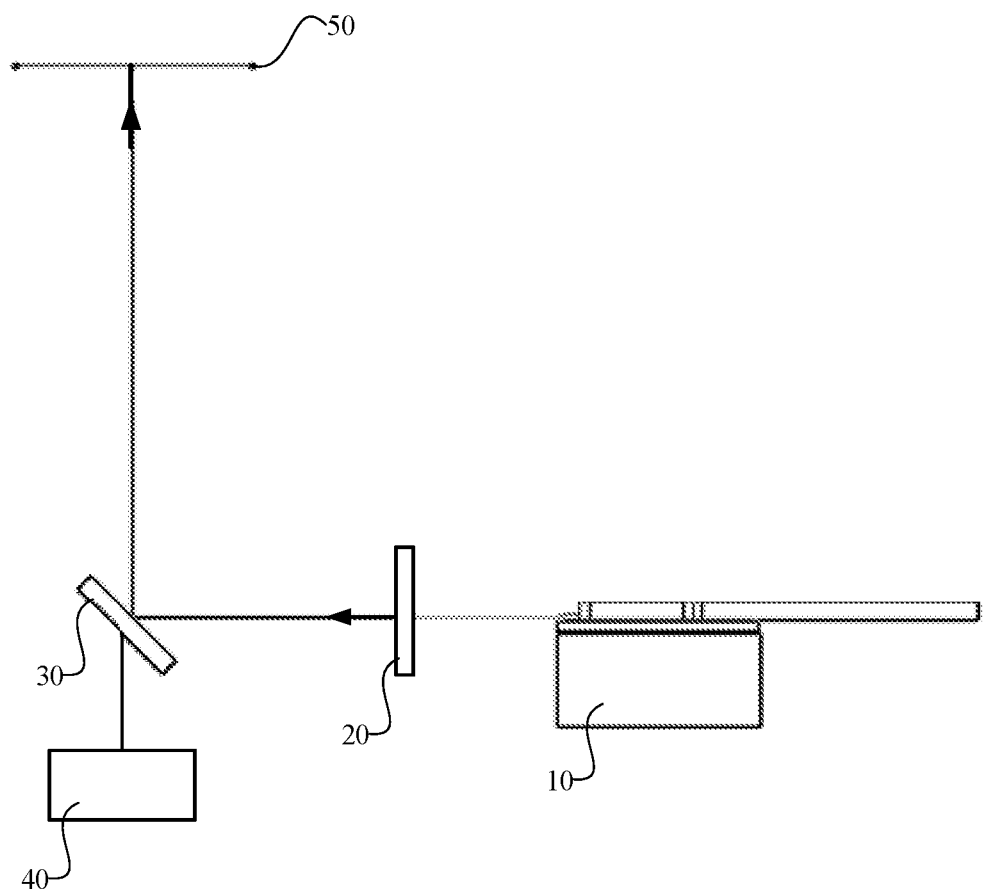
FIG. 1 is a schematic structural diagram of a light spot scanning device provided by an embodiment of the present invention.

Reference signs: 10—laser; 20—collimating lens; 30—reflector; 40—driving member; 50—working plane; a=the width of the linear light spot along the fast axis direction; b=the width of the linear light spot along the slow axis direction; c=the distance between the reflector and the working plane; d=distance of movement; m=area; t=duration that pulse power supply outputs low-level signal; ω=rotation angular velocity.

DETAILED DESCRIPTION OF EMBODIMENTS

In order to make objects, technical solutions and advantages of the embodiments of the present invention clearer, the technical solutions in the embodiments of the present invention will be described clearly and completely below in conjunction with accompanying drawings in the embodiments of the present invention. Obviously, the described embodiments are only a part of the embodiments of the present invention instead of all the embodiments. Usually, the assemblies of the embodiments of the present invention described and illustrated in the accompanying drawings herein can be arranged and designed through different arrangements.

Therefore, the following detailed descriptions for the embodiments of the present invention provided in the accompanying drawings are not intended to limit the protection scope of the present invention, but merely represent the selected embodiments of the present invention. Based on the embodiments of the present invention, any other embodiments obtained by those ordinarily skilled in the art without using any inventive efforts should be covered within the scope of protection of the present invention.

It should be noted that the same reference signs and letters in the following accompanying drawings indicate the same terms, and therefore, as along as a term is defined in a figure, it need not be further defined or explained in the figures thereafter.

In the description of the present invention, it should be noted that the orientation or position relations indicated by the terms "center", "upper", "lower", "left", "right", "vertical", "horizontal" "inner", "outside" and the like are based on the orientation or position relations shown in the accompanying drawings, or the orientation or position relations commonly arranged when the product according to the present invention is used, and they are just intended to conveniently describe the present invention and simplify the description, and are not intended to indicate or imply that the devices or elements as indicated must be in specific orientations or should be configured and operated in a specific orientations, and then should not be construed as limitations to the present invention. In addition, the terms "first", "second" "third" and the like are only intended for differentiated description and shall not be construed to indicate or imply relative importance.

In addition, the terms "horizontal", "vertical" and the like do not mean that the member should be horizontal or overhang absolutely, but it can be slightly inclined. For example, the term "horizontal" merely indicates that the direction is more horizontal with respect to the term "vertical", but it does not mean that the structure should be absolutely horizontal, while it may be slightly inclined.

In the description of the present invention, it should also be noted that, unless otherwise clearly specified and defined, terms "provide", "mount", "link" and "connect" should be understood in a broad sense, for example, they can be a fixed connection, a detachable connection, or an integral connection; they can be a mechanical connection or an electrical connection; they can be a direct connection or an indirect connection through an intermediate medium, and can be the internal communication between two elements. For a person ordinarily skilled in the art, they may understand the specific meaning of the above-mentioned terms in the present invention according to specific circumstances.

Embodiment 1

Referring to FIG. 1, this embodiment provides a light spot scanning device, which can be applied to medical cosmetology and industrial processing, which includes a laser 10 and a collimating lens 20 and a reflector 30 arranged in sequence along the optical path transmission direction of the laser 10. The reflector 30 is also connected to a driving member 40. The laser beam emitted by the laser 10 forms a linear light spot through the collimating lens 20. The driving member 40 drives the reflector 30 to continuously rotate according to a preset path, such that a plurality of linear light spots formed by continuous rotation are sequentially overlapped on the light exiting side of the reflector 30 to form a scanning linear light spot.

Figure 2:
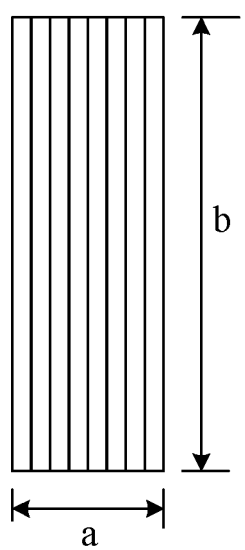
FIG. 2 is a linear light spot formed by a light spot scanning device provided by an embodiment of the present invention.

The laser 10 outputs a laser beam. For example, the laser 10 may be a semiconductor laser 10. The laser beam passes through a collimating lens 20. The collimating lens 20 includes a fast axis collimating lens 20 and a slow axis collimating lens 20. The laser beam is compressed and homogenized on the fast axis and the slow axis through the collimating lens 20 to form a uniform linear light spot with a small size, as shown in FIG. 2.

The linear light spot is then output to the reflector 30, and by the rotation of the reflector 30, the formed linear light spot is hit to the required working plane 50, wherein the working plane 50 is located on the light exiting side of the reflector 30. Each time the reflector 30 rotates, a group of linear light spots is formed, and multiple groups of linear light spots are formed by multiple times of rotation, and the multiple groups of linear light spots are sequentially overlapped on the light exiting side of the reflector 30 to form a scanning linear light spot. There is an overlapping region between adjacent linear light spots. The energy density of the light spots at overlapping region is higher than that of the original light spot. After testing, the overlapping region can reach 1.6 to 1.7 times the energy density of the original light spot.

The rotation of the reflector 30 is driven by the driving member 40. The rotation of the reflector is precisely controlled by the driving member to meet the size and uniformity of the linear light spot. The driving member 40 drives the reflector 30 to rotate to form a scanning linear light spot on the light exiting side of the reflector 30.

In the light spot scanning device provided by the embodiment of the present invention, the laser beam output by the laser 10 forms a uniform and small-sized linear light spot through the collimating lens 20, and the linear light spot is then emitted through the reflector 30, and the reflector 30 is driven to rotate by the driving member 40, with each time of rotation, a set of linear light spots is formed, after the reflector 30 rotates continuously according to the preset path, multiple sets of sequentially overlapping linear light spots are formed on the light exiting side of the reflector 30, called scanning linear light spots, adjacent linear light spots have overlapping region, the energy density of the overlapping region is higher than the energy density of the original light spot, which solves the problem of low energy density in the prior art. In addition, the rotation of the reflector 30 is used to superimpose the light spots without increasing the power of the laser 10, so that the light spot scanning device has a small structural size, low cost, and high reliability.

Here, the driving member 40 is a rotating electric machine, and the output shaft of the rotating electric machine is connected with the reflector 30, and the rotating electric machine rotates to drive the reflector 30 to rotate.

The light spot scanning device also includes a controller (not shown in the figure) and a pulse power supply (not shown in the figure) electrically connected to the laser 10. The pulse power supply is used to provide pulse current between the lasers 10, and the pulse power supply outputs high-level signal and low-level signal at intervals. When a low-level signal is output, the laser 10 has no laser beam output; when a high-level signal is output, the laser 10 outputs a laser beam.

The controller is respectively electrically connected to the pulse power supply and the driving member 40. When the pulse power supply outputs a low-level signal, that is, when the laser 10 has no laser beam output, the controller controls the driving member 40 to start working for a preset stroke, to make the reflector 30 to rotate by a preset stroke to form a set of linear light spots on the light exiting side of the reflector 30; then when the pulse power supply outputs a high-level signal, the laser 10 outputs a laser beam, which forms a linear light spot through the collimating lens 20, and waiting for the next time that the pulse power supply outputs a low-level signal, the controller controls the driving member 40 to start working for another preset stroke, so that the reflector 30 rotates by a preset stroke, and another set of linear light spots is formed on the light exiting side of the reflector 30; in such circle, after the reflector 30 rotates by a plurality of preset strokes, a plurality of groups of sequentially overlapping linear light spots are formed on the light exiting side of the reflector 30, and adjacent linear light spots have an overlapping region.

Figure 3:
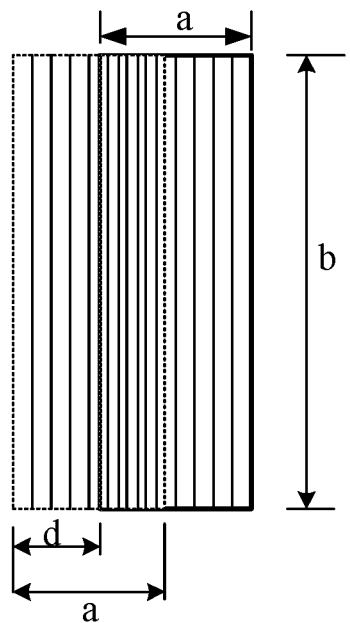
FIG. 3 is a scanning linear light spot formed by a light spot scanning device provided by an embodiment of the present invention.

As shown in FIG. 3, the overlap of two sets of linear light spots is formed. At any time when the reflector 30 is driven to rotate, adjacent linear light spots form an overlapping region, and the area m of the overlapping region satisfies: $m=(a-\omega ct)b$, wherein a is the width of the linear light spot along the fast axis direction; b is the width of the linear light spot along the slow axis direction, $\omega$ is the rotation angular velocity of the driving member 40; c is the distance between the reflector 30 and the working plane 50; and t is the duration that the pulse power supply outputs the low-level signal.

Through the above formula, the area m of the overlapping region of adjacent linear light spots can be calculated. It is convenient to adjust the known parameters in the above formula according to this formula, such as adjusting the distance c between the reflector 30 and the working plane 50 or the duration t of the low-level signal output by the pulse power supply, to change the area m of the overlapping region, and the area m of the overlapping region is related to the size of the energy density, then the energy density is changed to suit different applications.

The embodiment of the present invention also discloses a medical cosmetology device, which includes the light spot scanning device as described above. For example, when applied to hair removal, using the light spot scanning device can form a scanning linear light spot. The scanning linear light spot is a sequential superposition of multiple linear light spots. When adjacent linear light spots are superimposed, there is an overlapping region, and the energy density of the overlapping region is greater than the original light spot energy density, then hair removal energy is concentrated, the hair removal efficiency and the hair removal effect are improved, and the power of the laser 10 is not added, then the cost is low.

The medical cosmetology device includes the same structure and beneficial effects as the light spot scanning device in the foregoing embodiments. The structure and beneficial effects of the light spot scanning device have been described in detail in the foregoing embodiments, and will not be repeated here.

Embodiment 2

Figure 4:
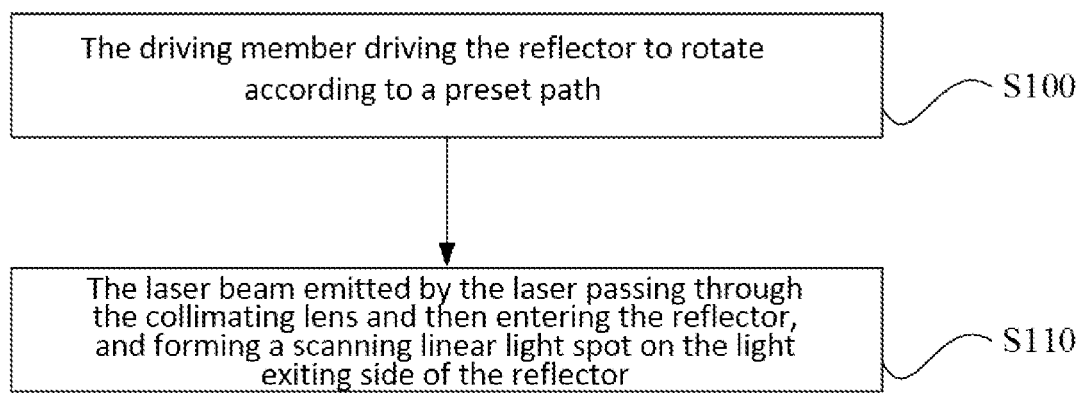
FIG. 4 is a flowchart of a light spot scanning method provided by an embodiment of the present invention.

As shown in FIG. 4, this embodiment provides a light spot scanning method, which includes:

S100: the driving member 40 driving the reflector 30 to rotate according to a preset path.

In response to the power-down signal of the laser 10, the driving member 40 drives the reflector 30 to rotate according to a preset path, wherein the light spot scanning device further includes a pulse power supply electrically connected to the laser 10, and the power-down signal of the laser 10 is a low-level signal of the pulse power supply. In other words, when the pulse power supply outputs a low-level signal, it means that the laser 10 is de-energized, and the driving member 40 drives the reflector 30 to rotate at this time.

S110: the laser beam emitted by the laser 10 passing through the collimating lens 20 and then entering the reflector 30, and forming a scanning linear light spot on the light exiting side of the reflector 30.

The laser beam output by the laser 10 forms a linear light spot through the collimating lens 20, and then passes through the reflector 30, the reflector 30 rotates, and a plurality of sequentially overlapping linear light spots are formed on the light exiting side of the reflector 30, that is, a scanning linear light spot is formed.

Specifically, when setting the light spot scanning device, setting the distance c between the reflector 30 and the working plane 50, setting the rotation angular velocity $\omega$ of the driving member 40, and setting the duration t that the pulse power supply outputs low-level signals, which means that the duration that the laser 10 does not output the laser beam is t, according to the area $m=(a-\omega ct)b$, the area m of the overlapping region of adjacent linear light spots can be calculated, thereby obtaining the energy density of the overlapping region.

Specifically, as shown in FIG. 3, the linear light spot moves along the fast axis direction by a distance $d=\omega ct$, where the moving distance d is in the range of 0 to a. In this way, after the linear light spot moves the moving distance d, it has an overlapping region with the original light spot. The width of the overlapping region in the fast axis direction is a-d, the area of the overlapping region $m=(a-d)b$, and due to the moving distance $d=\omega ct$, the area $m=(a-\omega ct)b$.

The above descriptions are only preferred embodiments of the present invention and are not used to limit the present invention. For those skilled in the art, the present invention can have various modifications and changes. Any modification, equivalent replacement, improvement, etc. made within the spirit and principle of the present invention shall be included in the protection scope of the present invention.

What is claimed is:

1. A light spot scanning device, comprising a laser, and a collimating lens and a reflector arranged in sequence along an optical path transmission direction of the laser, wherein the reflector is further connected with a driving member, and a laser beam emitted by the laser forms a linear light spot through the collimating lens, the reflector is continuously rotated according to a preset path, driven by the driving member, and a plurality of linear light spots formed by continuous rotation are sequentially overlapped on a light exiting side of the reflector, so as to form a scanning linear light spot; wherein the light spot scanning device further comprises a pulse power supply electrically connected to the laser, and the pulse power supply is configured to provide a pulse current between laser beam outputs; wherein the light spot scanning device further comprises a controller electrically connected to the pulse power supply and the driving element, respectively; wherein when the pulse power supply outputs a low-level signal, the controller controls the driving member to start working for a preset stroke.

2. The light spot scanning device according to claim 1, wherein the driving member is a rotating electric machine, and an output shaft of the rotating electric machine is connected to the reflector.

3. The light spot scanning device according to claim 1, wherein at any moment when the reflector is driven to rotate, an overlapping region is formed by adjacent linear light spots, and an area m of the overlapping region satisfies: $m=(a-\omega ct) b$, where a is a width of a linear light spot along a fast axis direction; b is a width of the linear light spot along a slow axis direction, $\omega$ is a rotation angular velocity of the driving member; c is a distance between the reflector and a working plane; and t is a duration that the pulse power supply outputs a low-level signal.

4. The light spot scanning device according to claim 1, wherein the laser is a semiconductor laser.

5. A medical cosmetology device, comprising the light spot scanning device according to claim 1.

6. A light spot scanning method, applicable to a light spot scanning device,
wherein the light spot scanning device comprises a laser, and a collimating lens and a reflector arranged in sequence along an optical path transmission direction of the laser,
wherein the reflector is further connected with a driving member, and a laser beam emitted by the laser forms a linear light spot through the collimating lens, the reflector is continuously rotated according to a preset path, driven by the driving member, and a plurality of linear light spots formed by continuous rotation are sequentially overlapped on a light exiting side of the reflector, so as to form a scanning linear light spot;
wherein the method comprises following steps:
the driving member driving the reflector to rotate according to the preset path; and
the laser beam emitted by the laser entering the reflector after passing through the collimating lens, and forming the scanning linear light spot on the light exiting side of the reflector;
wherein the step of driving member driving the reflector to rotate according to the preset path comprises the driving member responding to a power-down signal of the laser to drive the reflector to rotate according to the preset path.

7. The light spot scanning method according to claim 6, wherein the light spot scanning device further comprises a pulse power supply electrically connected to the laser, and the power-down signal of the laser is a low-level signal of the pulse power supply.

8. A light spot scanning device, comprising a laser, and a collimating lens and a reflector arranged in sequence along an optical path transmission direction of the laser, wherein the reflector is further connected with a driving member, and a laser beam emitted by the laser forms a linear light spot through the collimating lens, the reflector is continuously rotated according to a preset path, driven by the driving member, and a plurality of linear light spots formed by continuous rotation are sequentially overlapped on a light exiting side of the reflector, so as to form a scanning linear light spot; wherein the light spot scanning device further comprises a pulse power supply electrically connected to the laser, and the pulse power supply is configured to provide a pulse current between laser beam outputs; wherein at any moment when the reflector is driven to rotate, an overlapping region is formed by adjacent linear light spots, and an area m of the overlapping region satisfies: $m=(a-\omega ct) b$, where a is a width of a linear light spot along a fast axis direction; b is a width of the linear light spot along a slow axis direction, $\omega$ is a rotation angular velocity of the driving member; c is a distance between the reflector and a working plane; and t is a duration that the pulse power supply outputs a low-level signal.

9. The light spot scanning device according to claim 8, wherein the driving member is a rotating electric machine, and an output shaft of the rotating electric machine is connected to the reflector.

10. The light spot scanning device according to claim 8, wherein the laser is a semiconductor laser.

11. A medical cosmetology device, comprising the light spot scanning device according to claim 8.

* * * * *